US008580387B1

(12) United States Patent
Fedderly et al.

(10) Patent No.: US 8,580,387 B1
(45) Date of Patent: Nov. 12, 2013

(54) POLYUREA COMPOSITE ARMOR

(75) Inventors: Jeffry J. Fedderly, Ellicott City, MD (US); Gilbert F. Lee, Greenbelt, MD (US); Curtis A. Martin, Damascus, MD (US); Edward Balizer, Bethesda, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 142 days.

(21) Appl. No.: 13/245,901

(22) Filed: Sep. 27, 2011

(51) Int. Cl.
*B32B 27/40* (2006.01)
*C08G 18/32* (2006.01)
*C08G 18/60* (2006.01)

(52) U.S. Cl.
USPC ........ 428/423.1; 428/911; 428/912; 252/609; 528/64; 528/68

(58) Field of Classification Search
USPC ........ 252/609; 528/59, 61, 64, 68; 428/423.1, 428/911, 912
See application file for complete search history.

(56) References Cited

U.S. PATENT DOCUMENTS

| 5,922,435 A | 7/1999 | Lee et al. |
| 5,936,025 A | 8/1999 | Lee et al. |
| 7,300,893 B2 | 11/2007 | Barsoum et al. |
| 7,685,922 B1 * | 3/2010 | Martin et al. ................ 89/36.02 |

OTHER PUBLICATIONS

Z. Xue and J.W. Hutchinson, Neck retardation and enhanced energy absorption in metal-elastomer bilayers, Mechanics of Materials 39 (2007) 473-487.
A.V. Amirkhizi, J. Isaacs, J. McGee and S. Nemat-Nasser, An experimentally-based viscoelastic constitutive model for polyurea, including pressure and temperature effects, Philosophical Magazine, vol. 86, No. 36, Dec. 21, 2006, 5847-5866.
R.B. Bogoslovov, C.M. Roland and R.M. Gamache, Impact-induced glass transition in elastomeric coatings, Applied Physics Letters 90, 221910 (2007).
E. Balizer, G. Lee, J. Fedderly, W. Mock, Jr., R. Rinaldi, M. Boyce, G. Zoski and S. Toki, Investigation of the Elastic and Plastic Deformation of Polyurea With Different Molecular Weights Using Time-Resolved SAXS/WAXS, Fall 174th Technical Meeting of the Rubber Division of the American Chemical Society, Louisville, KY, Oct. 14-16, 2008.

* cited by examiner

*Primary Examiner* — Thao T. Tran
(74) *Attorney, Agent, or Firm* — Richard A. Morgan

(57) ABSTRACT

A composite armor including a ballistic armor layer and a directly attached polyurea layer. The polyurea layer is the cured reaction product of an isocyanate curing agent and a mixture of diamines having the general formula:

$H_2N\text{-Ph-}(C{=}O)\text{—}O\text{—}(CH_2\text{—}CH_2\text{—}CH_2\text{—}CH_2\text{—}O)_n\text{—}(C{=}O)\text{-Ph-}NH_2$, wherein in the mixture n in the ranges from 3 to 14 and the weight average value of n is about 9 to 10. Ph represents phenyl. In a preferred embodiment, the polyurea layer is the strike face. The composite armor is useful for light armor applications in which weight is a factor such as military vehicle armor and military boat armor.

11 Claims, 2 Drawing Sheets

POLYUREA COMPOSITE ARMOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The invention relates to ballistic armor for defeating a projectile. More particularly, the invention relates to a ballistic armor-polyurea composite.

2. Discussion of the Related Art

Polymer-metal composites have been used to produce armor that is lighter in weight than armor made entirely of metal. These composites have been developed to improve blast and shock resistance so that they can be used for ballistic armor to defeat a military projectile.

Polymer composite armor has been developed in combination with metals, ceramics and fiber reinforcements. The polymers were first used in composites to hold dissimilar materials together. It was not initially known that the polymer could contribute physical properties to the composite other than the adhesive property of physically holding dissimilar materials in place to interfere with a projectile. It has been found that polymers can be added to a composite armor to enhance the transfer of shock energy between two non-polymer materials. This is referred to as impedance matching. In contrast, it has been found that polymers can be added to a composite armor to decrease energy transfer. Decreased energy transfer decouples two non-polymer materials from each other. Decoupling is referred to as impedance mismatching.

Momentum trapping armor resulted from the discovery that the order in which a projectile encounters dissimilar materials in a composite armor influences the effectiveness of the armor. A high modulus polymer strike face may reduce the initial velocity of a projectile by a small amount. However that small amount can be enough for the underlying ceramic or metal armor to stop the projectile. In the alternative, a high strength, high elongation polymer can be applied as a backing to function as a spall liner that stops ceramic and metal fragments from becoming impact generated projectiles. In both applications, the polymer is elastically and plastically strained, causing energy adsorption within the polymer.

Polyurea coatings are of interest for coating because they are tougher than urethanes and can be applied to metal surfaces by spray techniques with good adhesion. Higher molecular weight polyureas have been tried for these composite armors. The result has been composites with lower than desirable energy absorption or shock impedance properties.

Generally, high strain rate sensitivity-hardening polyureas useful for composite armor demonstrate a Young's modulus of 1000 psi to 4000 psi when tested at slow strain rates. At high strain rates in the range of 1000/second to 100,000/second, a confined polymer demonstrates a Young's modulus of 350,000 psi to 500,000 psi or greater. When confined, the tensile strength increases from the range of about 2000-8000 psi to about 80,000 psi. Polyureas demonstrating these physical qualities are sold commercially under trade names such as Carboline® POLYCLAD® 707, Air Products VERSALINK® 1000 and SPI POLYSHIELD® Hi-E.

The potential for use of polyurea in composite armor has not been fully realized. Inventor has discovered that problems and deficiencies associated with the use of polyurea in composite armor can be solved or greatly reduced by the selection of polyurea and polyurea mixtures.

SUMMARY OF THE INVENTION

A composite armor includes a ballistic armor layer and a polyurea layer directly attached to the ballistic armor layer. The polyurea layer comprises the cured reaction product of an isocyanate curing agent and a mixture of diamines having the general formula:

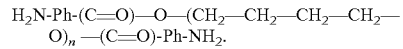

$H_2N\text{-Ph-}(C{=}O)\text{---}O\text{---}(CH_2\text{---}CH_2\text{---}CH_2\text{---}CH_2\text{---}O)_n\text{---}(C{=}O)\text{-Ph-}NH_2.$ In the general formula, Ph represents phenyl. In the mixture of diamines, the value of n in the general formula ranges from 3 to 14 and the weight average value of n in the general formula is about 9 to 10.

The resulting composite armor demonstrates improved ballistic blast and shock resistance. The polyurea is made of a diamine mixture and demonstrates elasticity and plasticity that functions in a composite armor to defeat a number of different projectiles.

Figure 2:
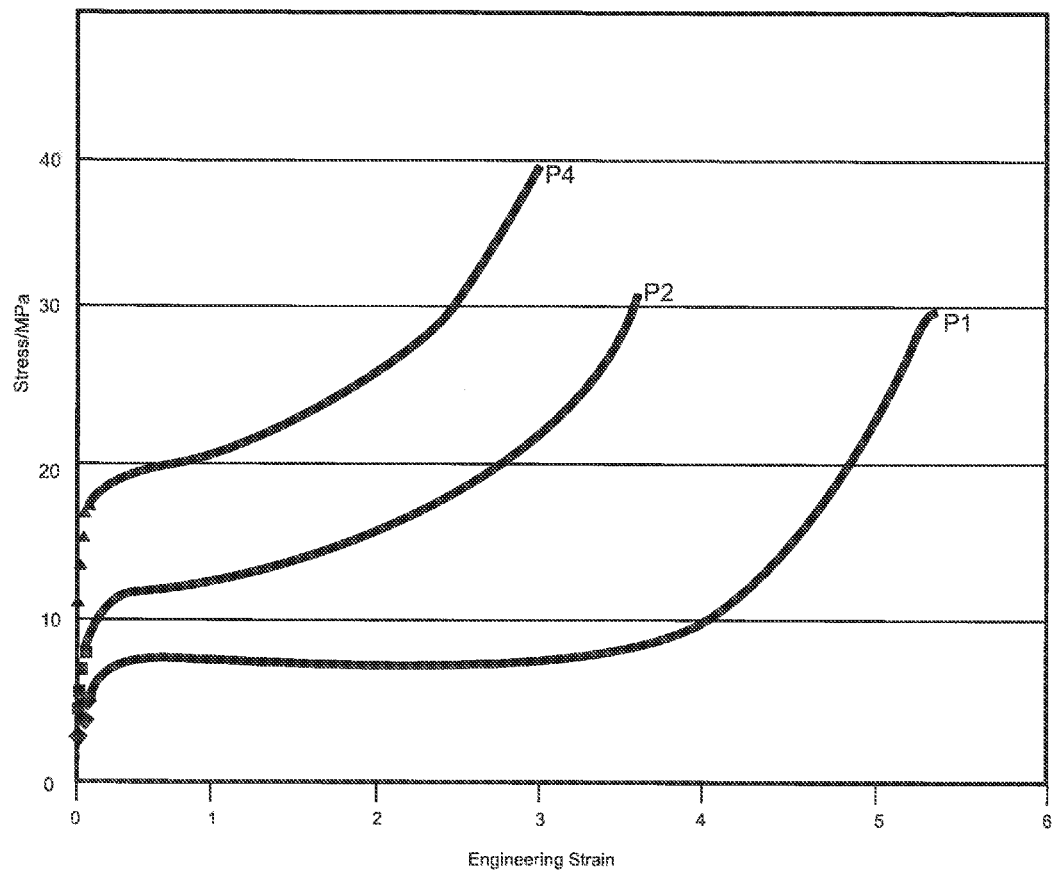
FIG. 2 is a plot of measured stress as a function of engineering strain for three polyureas.

The invention is described with reference to the drawing. The drawing discloses a preferred embodiment of the invention and is not intended to limit the generally broad scope of the invention as set forth in the claims.

DETAILED DESCRIPTION OF THE INVENTION

Polyurea is a copolymer synthesized by reaction of an aliphatic diamine with a diisocyanate curing agent. The diisocyanate curing agent is usually chain extended with a diamine and/or a diol. The aliphatic diamine segment of the polymer is usually relatively soft and the diisocyanate segment of the polymer is relative hard. Chemical differences between the soft aliphatic diamine segments and the hard diisocyanate segments cause the extended hard isocyanate segments to phase-separate from the soft segments to form hard domains that act as physical cross links in the elastic matrix. The morphology of the phase-separated hard-segment domains ranges from lamellae type stacks or platelets of isolated domains to long thread like regions that overlap or intersect, depending on quantity of precursors and polymerization conditions. Their elastic and plastic deformation response at high strains involves the orientation of the soft and hard segments and is of interest for absorbing applications at various strain rates.

Figure 1:
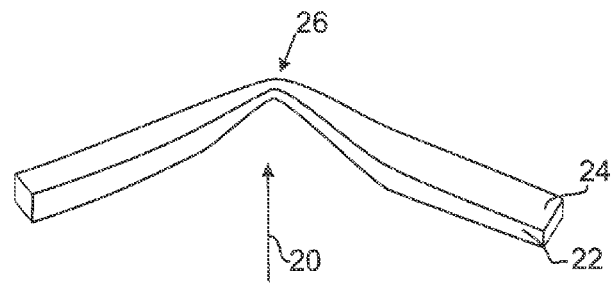
FIG. 1 is a cross-sectional view of a composite armor demonstrating necking after a projectile strike.

Polyureas were investigated for their effectiveness in combination with metal armor in stopping high speed projectiles. The projectiles of concern where those that penetrated the metal armor plate. The mechanism for the armor failure is necking failure. Polyurea-armor composites were considered to disrupt this mechanism. The polyureas of interest were those that demonstrated strain hardening to increase the effective modulus of a bi-layer composite to dissipate more energy and reduce necking failure. FIG. 1 is a cross-sectional view of composite armor comprising a metal armor strike surface 22 and a polyurea backing 24 after striking by a test projectile as indicated by directional arrow 20. The projectile caused necking but did not penetrate the plate. Neck 26 is evident. An alternate configuration is a polyurea strike surface and a metal armor backing.

Xue and Hutchinson have considered the phenomenon of delayed necking in polymer coated metal. Delayed necking is attributed to the polymer coating. The bi-layer protection is improved with increasing modulus of polymer with strain, i.e. strain hardening. Improved protection was found by using low molecular weight soft segments. (Z. Xue and J. W. Hutchinson, Neck retardation and enhanced energy absorption in metal-elastomer bilayers, Mechanics of Materials 39 (2007) 473-487.) It has also been reported that using a higher molecular weight polymer in a polyurea, results in improved ballistic protective performance. (R. B. Bogoslovov, C. M. Roland and R. M. Gamache, Appl. Phys. Lett. 90, 221910 (2007)).

Strain hardening of a polyurea sample is controlled by the molecular weights of the hard and soft segment precursors and by processing that yields a phase separated morphology. Increasing the amount of hard segments yields a sharper phase separation and an increase in modulus. Comparison of polyurethanes of varying proportions of hard segments and polyureas in both the low speed tensile compression test and high strain rate by split Hopkinson bar test, showed an increase in modulus for the greater hard segment content in the yield region and beyond, that would reduce necking protection in composite armor. As the stress at high strains also has strong contribution from the non-Gaussian elasticity terms, the finite extensibility of the soft segments provides an alternative mechanism of strain hardening by use of shorter soft segments chains. Assuming a phase separated system under tensile loading, the shorter soft segments orient and reach finite extensibility at lower strains resulting in increased strain hardening with the possibility of increasing their effectiveness when used as a protective coating.

An effective group of polyureas have been discovered. The polyureas are the cured reaction product of an isocyanate curing agent and a diamine having the general formula:

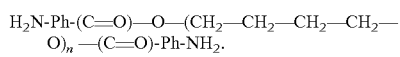
$H_2N$-Ph-(C=O)—O—($CH_2$—$CH_2$—$CH_2$—$CH_2$—O)$_n$—(C=O)-Ph-$NH_2$.

Ph represents phenyl. In the mixture of diamines, the value of n in the general formula ranges from 3 to 14 and the preferred weight average value of n is about 9 to 10.

The polyurea may be made from diamines having only the preferred weight average range for n in the general formula of 9 to 10. These diamines are available commercially under the trade name VERSALINK® P-650 oligomeric diamine from Air Products and Chemicals, Inc., Allentown, Pa. 18195-1501.

The preferred polyurea is made from a diamine mixture in which n in the general formula covers the range of 3 to 14. In the diamine mixture, the weigh average of the diamines in the mixture produces an average value of n in the range of 9 to 10. The desired value for n in the general formula can be achieved by a mixture of two groups of diamines. A lower molecular weight group of diamines has an n in the general formula ranging from 3 to 4. A higher molecular weight group of diamines has an n in the general formula ranging from 13 to 14. The lower molecular weight group and the higher molecular weight group are admixed in a ratio to produce a weight average value of n in the general formula of 9 to 10. The lower molecular weight group of diamines is available commercially under the trade name VERSALINK® P-250 oligomeric diamine and the higher molecular weight group of diamines is available commercially under the trade name VERSALINK® P-1000 oligomeric diamine from Air Products and Chemicals, Inc., Allentown, Pa. 18195-1501.

A third mixture of diamines is made by the admixture of diamines having a value of n in the general formula of 3 to 4 with diamines having a value of n in the general formula of 13 to 14 to produce a mixture having a weight average of n in the general formula of 9 to 10. That intermediate mixture is supplemented with diamines having a weight average of n in the general formula of 9 to 10. This mixture is made by combining the diamines VERSALINK® P-250, VERSALINK® P-650 and VERSALINK® P-1000 to produce a diamine mixture having a weight average value of n in the general formula of 9 to 10.

The diamine mixture is cured with a diisocyanate curing agent. ISONATE® 143L is a eutectic mixture of pure linear, symmetric p,p'-diphenylmethane diisocyanate (MDI) and a carbodiimide modified MDI triisocanate. ISONATE® 143L is available commercially from Dow Chemical Company, Midland, Mich. 48640. The triisocyanate component adds asymmetry to the structure to prevent hard domain crystallinity and higher functionality for modest cross linking. The tetramethylene oxide component serves as the soft segment for the polyurea, while the terminal aromatic amine and isocyanate components serve as the hard segment in the polyurea. The weight percent of hard segments in polyureas cured with ISONATE® 143L (MDI) is as follows.

TABLE 1

| Polyurea | Hard Segments |
|---|---|
| VERSALINK ® P-250-MDI | 36% |
| VERSALINK ® P-650-MDI | 47% |
| VERSALINK ® P-250:VERSALINK ® P-1000 (2.25:1 blend by weight)-MDI | 55% |

The polyureas are formed by combining the diamines, degassing and mixing under vacuum. The diisocyanate is then added in a stoichiometric amount or up to about five percent stoichiometric excess. Again, the mixture is thoroughly mixed and allowed to cure at room temperature for one to three days. The mold may include the metal armor plate to form the composite in a single step. In the alternative, the polyurea may be molded and cured first and then demolded and attached to a metal armor plate with adhesive to form the composite.

Multilayer composites may be formed by constructing a mold. Multiple metal armor layers are positioned in a frame, leaving a space of 0.1 to 1 inches between them to fill with polyurea. The space may be sealed by taping the sides and bottom of the mold with polymer tape of sufficient width to prevent liquid polymer from flowing out. Fluid polyurea is poured or infused into the space left in the mold and then cured. Curing is generally accomplished by holding the materials undisturbed in the mold for about 24 to 72 hours at room temperature. The composite can be cured at elevated temperature in an autoclave to reduce curing time. The polyurea solidifies without leaving any voids or bubbles and adheres to both adjoining metal armor layers. The cured polymer is functionally confined between the layers and forms a composite armor. The number of multiple layers is selected based on desired ballistic threat reduction and on dimensions of the armor product.

The polyurea strike face, i.e. strike surface, of a composite armor can reduce the initial velocity of the projectile by a small amount. That amount can be sufficient for the supporting metal armor to stop the projectile. The polyurea must have a high modulus to accomplish this. In the alternative the polyurea may be the back layer of a metal armor layer and function as a spall liner. In this case, the polyurea must have high strength and high elongation, i.e. yielding without breaking, to stop metal or ceramic fragments from becoming projectiles. Polyureas of the invention demonstrate strain elasticity and plasticity, allowing them to absorb energy within the polyurea layer.

The ballistic armor in the composite is a layer of armor such as surface hardened steel, aluminum alloy, titanium alloy, ceramic, glass and the like. A strike surface layer has the physical characteristics of rolled homogeneous armor such as that produced to U.S. Military Specification MIL-A 12560 and the like. Examples of steel include high carbon content modified steel such as American Iron and Steel Institute (AISI) grade 4340 (Ni—Cr—Mo) steel or 4130 (Cr—Mo) steel. The steel may also be U.S. Military Specification MIL-A 46100 or MIL-A 12560 ballistic armor. Another steel is HY-130 (Ni—Cr—Mn-Mo). These ballistic armors are commercially available in thicknesses of 0.25 inches to 6 inches. The thickness of steel plate is 0.25 to 1 inch. A steel plate thickness of 0.25 to 0.40 inches has been found to be effective and practical. For example, HY-130 (Ni—Cr—Mn-Mo) plate has been found to be effective in a thickness of 0.25 inches. The armor strike face, shown in FIG. 1 as layer 22, is effective in stopping a projectile and shrapnel and in deforming and slowing a penetrator that succeeds in breaching it.

A suitable titanium armor is titanium alloy Ti-6Al-4V (Ti with nominally 6 wt % Al and 4 wt % V). Another titanium armor is an alloy comprising 50 wt % to 60 wt % titanium and 40 wt % to 50 wt % nickel. This armor is characterized in elastic strain deformation that allows for adsorption of large amounts of energy from a projectile and release of the stress through return to shape. A titanium plate thickness of 0.25 to 0.40 inches has been found to be effective.

The aluminum aLutor alloys which are most widely accepted for use are alloy 5083 meeting the requirements of U.S. Military Specification MIL-A46027F (MR), and alloy 7039 meeting the requirements of U.S. Military Specification MIL-A46063E. Alloy 5086 has been used in vehicle armor including in the M-113 Armored Personnel Carrier and the M-2 Bradley Infantry fighting vehicle. The alloy designations herein are in accordance with alloy numbers and corresponding definitions registered by the Aluminum Association, Inc., Washington, D.C. 20006.

U.S. Military Specifications have been developed for ballistic performance in terms of the speeds of two types of projectiles. One projectile is an armor piercing (AP) 0.30 caliber projectile characterized by a pointed leading end. The other projectile is a fragment simulating (FS) 20 mm projectile characterized by a blunt leading end. The blunt end projectile creates spall from the inner side of an armor plate, even when the projectile fails to penetrate the plate. Armor plate of alloy 7039 is superior to armor plate of alloy 5083 for armor piercing (AP) ballistic performance, but less so for (FS) ballistic performance.

Ballistic ceramic armor includes plates and tiles made of a ceramic material such as aluminum oxide, silicon carbide, boron carbide, titanium diboride, aluminum nitride, silicon nitride, tungsten carbide and the like.

The composite armor is lighter in weight than ballistic metal plates of equivalent penetration resistance. The composite armor is intended for use in application where reduced weight would be beneficial. Applications include military vehicles and ships. The composite armor plates may also be used as a facing on buildings.

This invention is shown by way of Example.

Example 1

Thermal Properties

The diamine materials used were VERSALINK® P-1000, VERSALINK® P-650, VERSALINK® P-250 and VERSALINK® 740M. These were cured with ISONATE® 143L diisocyanate (MDI). The diamines and a 5% stoichiometric excess of ISONATE® 143L were added to a double planetary mixer. The mixer was evacuated to degas the precursor materials and the contents mixed under vacuum. The mixed materials were each injected into an aluminum mold to form 2 millimeter thick sheets. The polyurea sheets solidified in a few minutes and were allowed to cure at room temperature for several days.

Glass transition temperature of the cured polyureas was measured with a Thermal Analysis Model 2920 Modulated Differential Scanning calorimeter (DSC). Test specimens weighing about 0.015 grams were cut and placed in a standard aluminum pan and covered with an aluminum lid. The differential scanning calorimeter was cooled to −170° C. with liquid nitrogen. The temperature scan was increased at 20° C./minute from −170° C. to 120° C. The glass transition temperature was indicated as a step change in the heat flow versus temperature curve. Results are reported in Table 2.

TABLE 2

| Polyurea (Characterized by diamine) | Glass Transition Temperature |
|---|---|
| P1, VERSALINK ® P-1000 | −58° C. |
| P2, VERSALINK ® P-650 | −20° C. |
| P3, VERSALINK ® P-1000/P-250/740M (mixture 1:0.13:0.007 by weight) | −56° C. |
| P4, VERSALINK ® P-1000/P-250 (mixture 1:0.58 by weight) | 30° C. |
| P5, VERSALINK ® P-1000/P-250 (mixture 1:0.91 by weight) | 56° C. |
| P6, VERSALINK ® P-250 | 112° C. |

Glass transition temperature was measured with a differential scanning calorimeter (DSC) instrument in accordance with the ASTM D-3417 test method. Glass transition temperature is an indication of average molecular weight.

Glass transition temperature for polyureas P4 and P5 was a function of the relative amount of the lower molecular weight constituent. This indicated phase mixing between VERSALINK® P-250 and VERSALINK® P-1000. The glass transition temperature of polyurea P3 resembled that of polyurea P1 (VERSALINK® P-1000). This indicated that VERSALINK® P-250 and VERSALINK® 740M did not phase mix with the VERSALINK® P-1000. The failure to phase mix may have been due to the amount of the lower molecular weight diamines being too low to have an effect on the average molecular weight, as indicated by glass transition temperature.

In one embodiment the mixture of diamines includes a minor amount of a diamine of the general formula:

$$H_2N\text{-Ph-}(C=O)-O-(CH_2)_x-O-(C=O)\text{-Ph-}NH_2,$$

wherein: Ph represents phenyl and the value of x is about 2 to 4. For example, VERSALINK® 740M is trimethylene glycol di-p-aminobenzoate of molecular weight 314 having the general formula:

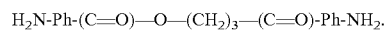

$$H_2N\text{-Ph-}(C=O)-O-(CH_2)_3-(C=O)\text{-Ph-}NH_2.$$

In the general formula, Ph represents phenyl. This diamine is available commercially under the trade name VERSALINK® 740M diamine curative from Air Products and Chemicals, Inc., Allentown, Pa. 18195-1501.

Example 2

Quasi-Static Tensile Properties

Tensile measurements were carried out in accordance with ASTM D-412 Rubber Properties in Tension using a Tinius Olsen 1000 lbf Locap with Machine Display, Electromatic/LoCap Digital to 602 with 289/496 control system. The measurements were made at ambient temperature at crosshead speed of 20 inches/minute. The data taken was plotted in FIG. 2 where measured stress is plotted as a function of engineering strain.

In FIG. 2, the results of tensile stress-strain measurements for three polyureas is shown. The three polyureas used were
P1, VERSALINK® P-1000 cured with ISONATE® 143L.
P2, VERSALINK® P-650 cured with ISONATE® 143L,
P4, VERSALINK® P-1000/P-250 (1:0.58 weight ratio) cured with ISONATE® 143L.

The data showed that yield point of the higher molecular weight VERSALINK® P-1000 was increased by adding the lower molecular weight VERSALINK® P-250 to the polyurea. The break point is the high end of the stress-strain curves. The yield before break of the polyurea formulated from the diamine blend was greater than for the polyurea formulated from the single diamine of approximately same molecular weight, i.e. VERSALINK® P-650. The polyurea made of a diamine mixture had the highest modulus, yield strength and stress to break values compared to the single diamine polyureas, while maintaining the same strain to break of the equivalent molecular weight material. This showed that tensile properties of a single diamine polyurea were improved with an equivalent molecular weight mixture of diamines.

The improvement has utility in combining the polyurea with plate armor to form a composite armor demonstrating reduced necking in the ballistic armor layer.

Example 3

Ballistic Performance

Ballistic threshold penetration velocity is a ballistic test for armor. In the test, bullets are fired at the armor at increasing velocities until they start to penetrate. Test results are reported as $V_{50}$, the velocity of the bullets at which 50% of the bullets penetrate the armor. The $V_{50}$ test is a measure of the breaking point of an armor specimen. The results may be reported as normalized $V_{50}$. Normalized $V_{50}$ is the $V_{50}$ value of a test specimen divided by the $V_{50}$ value of a known armor. Normalized $V_{50}$ is a comparison of the performance of the two armors.

The ballistic threshold penetration velocity, $V_{50}$ was measured for polyureas P1, P2, P3 and P4 from Example 1. A 50-caliber fragment simulating projectile was used in the tests. The targets were 2.54 centimeter thick ballistic armor face plate with a 2.54 centimeter thick polyurea backing layer. The ballistic armor face plate was type 5086 aluminum armor.

The ballistic results were normalized to the $V_{50}$ velocity of the P1 polyurea. Results of the test are reported in Table 3.

TABLE 3

| Polyurea (MDI cured, Characterized by diamine) | Normalized $V_{50}$ |
|---|---|
| P1, VERSALINK ® P-1000 | 1.00 |
| P2, VERSALINK ® P-650 | 1.07 |
| P3, VERSALINK ® P-1000/P-250/740M (mixture 1:0.13:0.007 by weight) | 1.08 |
| P4, VERSALINK ® P-1000/P-250 (mixture 1:0.58 by weight) | 1.16 |

The normalized $V_{50}$ values increased as the molecular weight, yield point and stress to break increased. The reason for this increase is thought to be that the increasing shock impedance of the polyurea was a better impedance match with the aluminum plate. That is, shock energy from the projectile was transferred from the aluminum to the polyureas more efficiently in higher modulus polyureas. The P4 polyurea with a high modulus was a better impedance match with the aluminum armor plate than the other polyureas. P4 also had a high value for strain to break. This may have increased the $V_{50}$ velocity by the polyurea allowing some deformation of the aluminum to delay necking, thereby delaying the onset of fracture in the aluminum plate.

Example 4

Ballistic Performance

Ballistic performance was simulated by computer modeling. Example 3 was repeated by computer simulation with the polyurea layer as the strike face and the ballistic aluminum layer as the backing. The $V_{50}$ velocity was found to be higher with the polyurea strike face.

Example 5

Ballistic Performance

Computer simulations were made of the polyurea-ballistic armor composites. The computer simulations showed that the polyurea strike face absorbed kinetic energy from the projectile to increase the $V_{50}$ velocity of the composite armor.

Example 6

Figure 3:
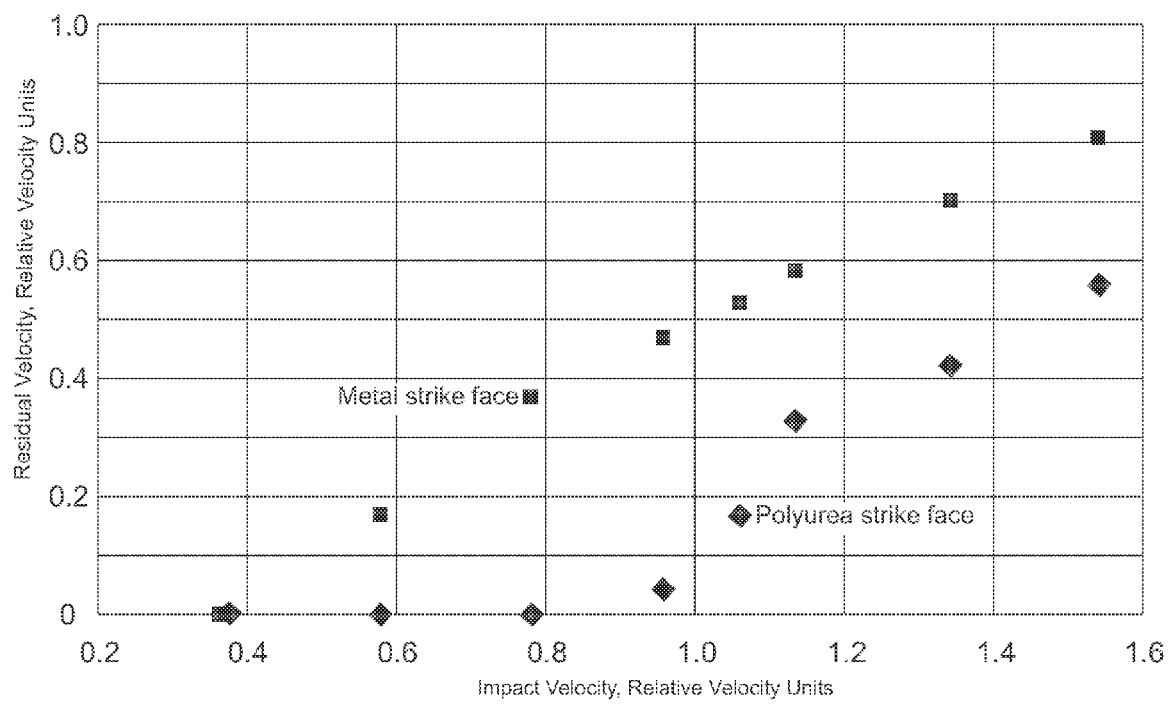
FIG. 3 is a plot of calculated residual velocity versus impact velocity to compare the effect of a metal and a polyurea strike face.

Computer simulations were made of polyurea-ballistic armor composites. The simulation composite armor was a 0.953 centimeter thick armor steel plate and a 2.54 centimeter thick Versathane® P-1000 polyurea layer. The calculated relative residual velocity was plotted against relative initial impact velocity as shown in FIG. 3, to compare the results of a metal and a polyurea strike face. The $V_{50}$ value is the impact velocity for a zero residual velocity. The $V_{50}$ value for the projectile striking the metal plate first was about 45% lower than the value for projectile striking the polymer first. It appeared to us that the polymer reduced the velocity of the projectile enough for the metal plate to stop it.

Example 7

Example 7a

Materials

The starting diamines were Versalink P-1000, P-650 and P-250 obtained from Air Products and Chemicals. The number values, 1000, 650, and 250, refer to the nominal molecular weights of the polyol starting materials for the diamines. The diamines consist of tetramethyleneoxide repeat units with primary aromatic amine termination. The starting isocyanate, ISONATE® 143L was obtained from Dow Chemical. ISONATE® 143L is a eutectic mixture of pure linear, symmetric p,p'-diphenylmethane diisocyantate (MDI) and a carbodiimide modified MDI triisocyanate. The triisocyanate component adds asymmetry to the structure to prevent hard domain crystallinity and higher functionality for modest cross-linking. The tetramethyleneoxide component serves as the soft segment for the polyurea while the terminal aromatic amine and isocyanate components serve as the hard segment. The weight percent of hard segments for the polyureas P-1000, P-650 and P-250/P-1000 blend polyureas (2.25:1) is 36%, 47% and 55% respectively.

The starting materials were degassed and mixed under vacuum in a double planetary mixer. The mixed material was injected into an aluminum mold to form 2 mm thick sheets. Samples for the various characterizations were taken from the sheets. "Dog-bone" type specimens, 50 mm total length, 3.175 mm width and 2.0 mm thick were die cut for tensile testing. Bars with nominal dimensions of 2 mm thick, 10 mm wide and 25 mm long were cut for dynamic mechanical analysis (DMA) testing and small shavings were cut for DSC samples.

Example 7b

Differential Scanning Calorimetry (DSC)

Differential scanning calorimetry was carried out with a Thermal Analysis 2920 modulated differential scanning calorimeter. A liquid nitrogen cooling accessory was used. Samples of approximately 4 mg were cut from a 2 mm sheet for each of the P-1000, P-650 and P-250/P-1000 blend polyureas, kept under nitrogen and equilibrated for 10 minutes at −150° C. and then heated at a scanning rate of 20° C./minutes. The temperature range covered from −150° C. to 200° C.

The differential scanning calorimeter curves for each of the polyureas showed decreasing glass transition temperature with increasing molecular weight. The largest soft segment of P-1000 polyurea had the lowest glass transition temperature of −58° C., a strong indication of good phase separation. The P-650 polyurea and P-250/P-1000 blend polyureas showed a glass transition temperature at −20° C. and 30° C. respectively, both increased in temperature compared to the P-1000 polyurea and decreased in strength of transition. This decrease was the effect of constraints on the lower molecular weight soft segments by hard domains as well as phase mixing. The P-250/P-1000 blend polyurea did not appear to have separate glass transition temperatures for each of P-1000 polyurea and P-250 polyurea, but a single glass transition temperature indicating compatibility.

However, small angle x-ray scattering (SAXS) results showed that for the P-250/P-1000 blend polyurea there was a large amount of phase mixing and that the P-1000 polyurea component of this blend was not a random coil but extended thus increasing its glass transition temperature. For temperatures greater than 100° C. the hard segment domains showed exotherms were attributed to rearrangements of the hard segments for the P-650 and P-250/P-1000 blend polyureas that were increasingly phase mixed. However, the shorter chain soft segments and their connectedness constraints induced defects in their hard domains resulting in more segmental motion. We considered that degradation may have also occurred for the hard segments. The differential scanning calorimetry (DSC) curve of the well phase separated P-1000 polyurea did not show such a reformation exotherm in this temperature region.

Example 7c

Dynamic Mechanical Analysis (DMA)

Dynamic mechanical analysis measurements were performed with a Thermal Analysis Q800 Dynamic Mechanical Analyzer. Sample strips 2 mm thick, 10 mm wide and 25 mm long and a gauge length of 10 mm were tested in tension mode at a frequency of 1 Hz and strain amplitude of 0.1% and heating rate of 3°/minute over a temperature range from −150° C. to 150° C. The storage modulus, the loss modulus and the tan δ were then measured for the samples of soft segment of P-1000, P-650 and P-250/P-1000 blend polyureas.

Both the storage modulus and the loss tangent taken at a frequency of 1 Hz over the temperature range from −150° C. to 150° C. were plotted. The glass transition temperature increased with decreasing molecular weight from −30° C. to 48.9° C. to 85° C. for the respective soft segment molecular weights P-1000, P-650 and P-250/P-1000 blend polyureas corresponding to the trends of the DSC results. The glass transition was the sharpest for the P-1000 polyurea. The glass transition of P-650 polyurea showed a shoulder and peak which indicated a bimodal distribution of hard segment domains affecting the soft domains as a blend of two different diisocyanates used. Furthermore, the soft segments may have been bimodal. The P-250/P-1000 blend polyurea showed the largest loss tan δ and maintained a large loss at temperatures above 100° C. compared to the other polyureas. The large glass transition temperature increased and tan δ values for the P-650 and P-250/P-1000 blend polyureas indicated the increase of phase mixing that occurs with decreasing molecular weight. This phase mixing was confirmed by differential scanning calorimetry (DSC) and small angle x-ray scattering (SAXS) images. We found two sub glass transition temperature modes that are analogous to those in polyurethanes. A γ transition at −130° C. due to $(CH_2)_n$ sequences and a β transition at −70° C. that was due to absorbed water molecules. The β transition peak was large for the P-650 polyurea and greatest for the P-250/P-1000 blend polyurea where there was more phase mixing and a lower density allowing for more water absorption. There was also another peak at −20° C. for the more phase mixed P-250/P-1000 blend polyurea. This peak may have related to the glass transition temperature of isolated domains of the P-1000 soft segment in the blend polyurea. The elastic modulus E' values indicated for a frequency of 1 Hz that the mechanical strain is rubbery at room temperature for the P-1000 and was in the glass transition for the other lower molecular weight soft segments. Thus the P-1000 polyureas was highly elastic and the P-650 and P-250/P-1000 blend polyureas are expected to have reduced elasticity but increasingly greater plasticity upon deformation.

Example 7d

Tensile Testing: First Hysteresis Cycle Behavior

Full hysteresis stretch cycles were plotted for P-650, P-1000 and P-250/P-1000 blend polyureas. The largest hysteresis appeared in the first cycle of 0.5 strain and the area of this cycle increased with decreasing molecular weight in the first hysteresis diagrams. The shape of the hysteresis loop in this cycle was that of the small strain modulus which then went into the nonlinear region and then the yield region. The sample was then relaxed to zero stress. For the lower molecular weight of the P-250/P-1000 blend polyurea, the linear elastic region had the largest modulus of 250 MPa at small strains compared to 70 MPa for the P-1000 polyurea. There was a sharper change in the nonlinear transition to the flow region due to phase mixing of the longer P-1000 molecular weight soft segments by the lower molecular weight P-250 chains. This increase in the glass transition temperature and corresponding increase in the viscosity was such that a higher modulus in the elastic and post yield region resulted. The strain hardening in the flow region increased from a slight softening for the P-1000 polyurea to incremental increases in modulus with strains beyond the yield for the P-650 and P-250/P-1000 blend polyureas. Upon relaxation to zero stress the P-250/P-1000 blend polyurea had the least elastic response noted by lack of return to initial strain and largest plastic remnant deformation. The P-650 and P-1000 molecular weight polyureas showed greater elasticity and return to smaller strains upon relaxation. Thus, the P-250/P-1000 blend polyurea had the largest hysteretic energy loss of the polyureas tested. That would facilitate dissipation of energy by small strain cycles in composite armor.

Example 7e

Tensile Testing: Tensile Strain Hardening

Tangent moduli for small strains at initial stress were measured and plotted for P-650, P-1000 and P-250/P-1000 blend polyureas. For higher cycles than the first a strong softening of the modulus was shown. An asymptotic decrease was shown after the cycle of strain 2.0 as the hard domains were broken down. However the finite chain extensibility appeared in the hysteresis plot and increased the strain hardening at large strains in the series of the hysteresis loops for each polyurea. At high strains the envelope of points of the hysteresis loops outlined a stress strain curve for continuously increasing strain.

Tangent moduli at large strain at the end of the cycle, i.e. the tangent to the stress strain envelope was measured and plotted for P-650, P-1000 and P-250/P-1000 blend polyureas. In the plot, the tangent modulus of this envelope with strain for the modulus (strain hardening) at large strain greatly increased with decreasing soft segment molecular weight for the strain region less than 2.0 and then appeared to increase more slowly. The behavior of the modulus of the stress strain envelope showed an increase by factor of almost three for the P-650 polyurea over that of the P-1000 polyurea and almost four fold increase for the P-250/P-1000 blend polyurea. This modulus increase was attributed to the higher glass transition temperature (phase mixing) of the P-250/P-1000 blend polyurea as compared to the P-1000 polyurea since both have hard domains of the P-1000 polyurea. This was also substantiated by small angle x-ray scattering (SAXS) results of the motions of the hard and soft domains upon deformation.

The foregoing discussion discloses and describes embodiments of the invention by way of example. One skilled in the art will readily recognize from this discussion, that various changes, modifications and variations can be made therein without departing from the spirit and scope of the invention as defined in the following claims.

What is claimed is:

1. A composite armor including a ballistic armor layer and a directly attached polyurea strike surface layer comprising: the cured reaction product of an isocyanate curing agent and a mixture of diamines having the general formula:

$$H_2N\text{-Ph-}(C\!\!=\!\!O)\text{---}O\text{---}(CH_2\text{---}CH_2\text{---}CH_2\text{---}CH_2\text{---}O)_n\text{---}(C\!\!=\!\!O)\text{-Ph-}NH_2$$

wherein: Ph represents phenyl and in the mixture of diamines, a first diamine has a value of n in the general formula of about 13 to 14 and a second diamine has a value of n in the general formulas of about 3 to 4; and wherein: in the mixture of diamines the ratio of first diamine:second diamine is about 1:0.58 to 1:0.91 by weight.

2. The composite armor of claim 1 comprising a second ballistic armor layer with a second polyurea layer between the ballistic armor layer and the second ballistic armor layer.

3. The composite armor of claim 1 comprising two layers, a ballistic armor layer and a strike surface comprising the polyurea layer.

4. The composite armor of claim 1 wherein the mixture of diamines includes a minor amount of a diamine of the general formula:

$$H_2N\text{-Ph-}(C\!\!=\!\!O)\text{---}O\text{---}(CH_2)_x\text{---}O\text{---}(C\!\!=\!\!O)\text{-Ph-}NH_2,$$

wherein: Ph represents phenyl and the value of x is about 2 to 4.

5. The composite armor of claim 1 wherein the ballistic armor layer is a metal armor selected from the group consisting of aluminum alloy armor, steel alloy armor and titanium alloy armor.

6. The composite armor of claim 1 wherein the ballistic armor layer is an aluminum alloy armor.

7. A composite armor including a ballistic armor layer and a directly attached polyurea strike surface layer comprising: the cured reaction product of an isocyanate curing agent and a mixture of diamines having the general formula:

$$H_2N\text{-Ph-}(C\!\!=\!\!O)\text{---}O\text{---}(CH_2\text{---}CH_2\text{---}CH_2\text{---}CH_2\text{---}O)_n\text{---}(C\!\!=\!\!O)\text{-Ph-}NH_2,$$

wherein: Ph represents phenyl, and the mixture of diamines consists of a first diamine having a value of n in the general formula of about 13 to 14 and a second diamine having a value of n in the general formula of about 3 to 4; and
wherein: the ratio of the first diamine:the second diamine in the mixture of diamines is about 1:0.58 to 1:091 by weight.

8. The composite armor of claim 7 comprising a second ballistic armor layer with a second polyurea layer between the ballistic armor layer and the second ballistic armor layer.

9. The composite armor of claim 7 comprising two layers, a ballistic armor layer and a strike surface comprising the polyurea layer.

10. The composite armor of claim 7 wherein the ballistic armor layer is a metal armor selected from the group consisting of aluminum alloy armor, steel alloy armor and titanium alloy armor.

11. The composite armor of claim 7 wherein the ballistic armor layer is an aluminum alloy armor.

* * * * *